US008160804B2

(12) United States Patent
Chominsky et al.

(10) Patent No.: US 8,160,804 B2
(45) Date of Patent: Apr. 17, 2012

(54) SYSTEM AND METHOD FOR THERMAL MANAGEMENT OF ENGINE DURING IDLE SHUTDOWN

(75) Inventors: Wesley Chominsky, Greensboro, NC (US); Ronald C. Dehart, Kernersville, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 250 days.

(21) Appl. No.: 12/448,540

(22) PCT Filed: Dec. 19, 2007

(86) PCT No.: PCT/US2007/026131

§ 371 (c)(1), (2), (4) Date: Jun. 24, 2009

(87) PCT Pub. No.: WO2008/085400

PCT Pub. Date: Jul. 17, 2008

(65) Prior Publication Data

US 2010/0030456 A1 Feb. 4, 2010

(51) Int. Cl.

*G06F 19/00* (2011.01)
*G06G 7/70* (2006.01)
*F02N 11/08* (2006.01)

(52) U.S. Cl. .................................... 701/112; 123/179.4

(58) Field of Classification Search ........................ None
See application file for complete search history.

(56) References Cited

U.S. PATENT DOCUMENTS

| | | | | |
|---|---|---|---|---|
| 1,332,332 | A * | 3/1920 | Good | 123/41.08 |
| 4,414,937 | A * | 11/1983 | Ueda et al. | 123/198 D |
| 4,421,075 | A | 12/1983 | Mandel | |
| 4,494,497 | A * | 1/1985 | Uchida et al. | 123/179.4 |
| 4,615,316 | A | 10/1986 | Yasuhara | |
| 4,665,319 | A * | 5/1987 | Seepe et al. | 290/3 |
| 5,179,920 | A * | 1/1993 | Bender | 123/198 DB |
| 5,619,412 | A | 4/1997 | Hapka | |
| 5,732,676 | A * | 3/1998 | Weisman et al. | 123/436 |
| 6,067,489 | A | 5/2000 | Letang | |
| 6,330,873 | B1 * | 12/2001 | Letang et al. | 123/322 |
| 7,091,629 | B2 * | 8/2006 | Hawkins | 307/10.6 |
| 7,099,768 | B2 | 8/2006 | Moriya | |
| 7,497,195 | B2 * | 3/2009 | Umezu et al. | 123/179.4 |

* cited by examiner

*Primary Examiner* — Stephen K Cronin
*Assistant Examiner* — Sherman Manley
(74) *Attorney, Agent, or Firm* — Martin Farrell; Michael Pruden

(57) ABSTRACT

A system and method for controlling an internal combustion engine of a vehicle during an automatic shutdown process, in particular to cool the engine to a predetermined safe shutdown temperature, includes the steps of determining that vehicle-idle conditions exist and whether an engine-associated temperature exceeds a predetermined first threshold temperature value, for which a cooling fan is operated to cool the engine, or higher second threshold temperature, for which at least one of the cooling fan and a coolant pump is operated above idle levels and the engine speed may be increased above idle to cool the engine. Cooling fan and/or coolant pump operation is reduced when the engine temperature is determined to have decreased to below the first threshold temperature value. Finally, engine shutdown is completed when predetermined shutdown conditions are fulfilled.

15 Claims, 1 Drawing Sheet

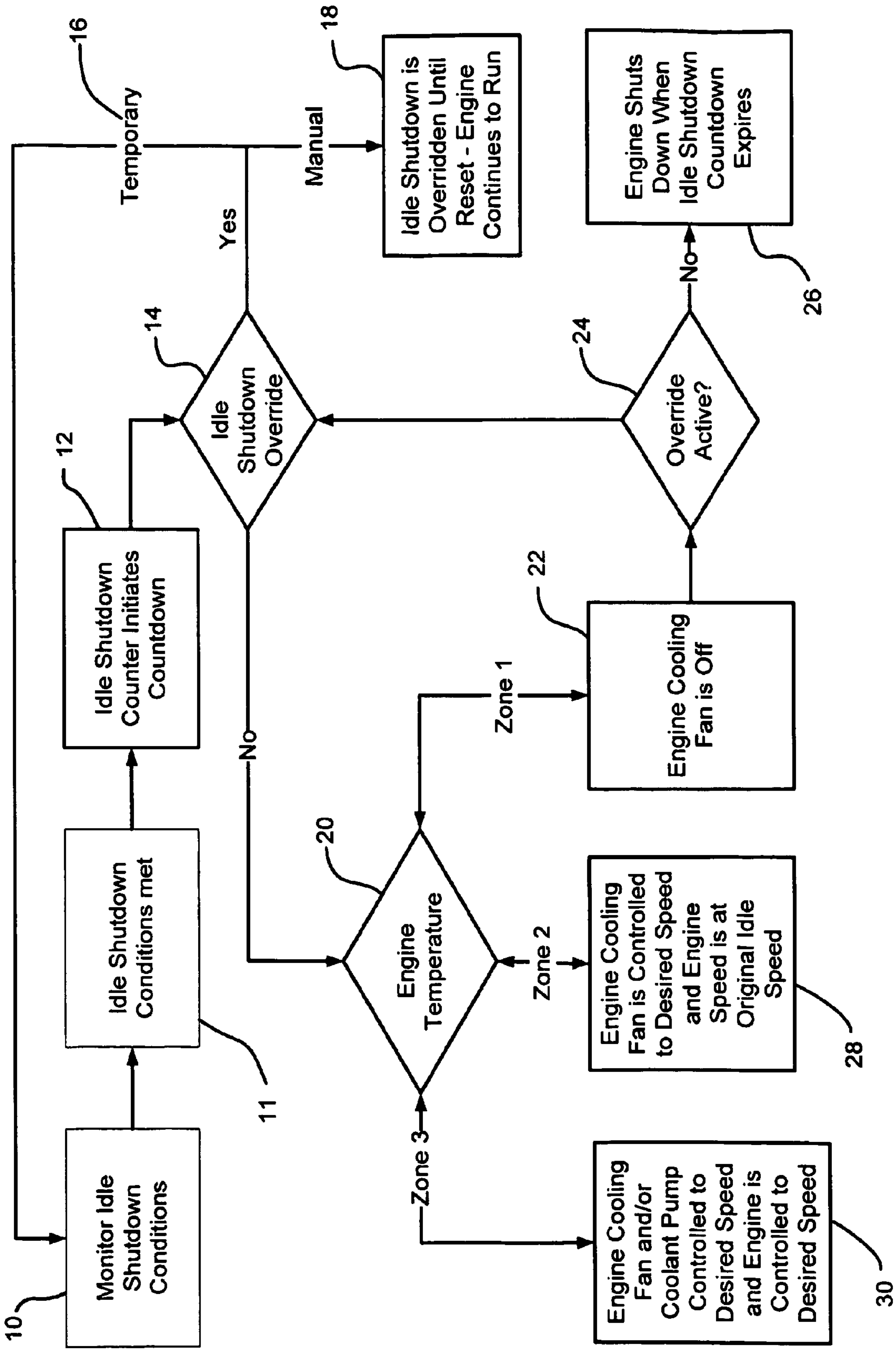

10
Monitor Idle Shutdown Conditions
11
Idle Shutdown Conditions met
12
Idle Shutdown Counter Initiates Countdown
14
Idle Shutdown Override
Yes
Temporary
16
Manual
18
Idle Shutdown is Overridden Until Reset - Engine Continues to Run
No
20
Engine Temperature
Zone 1
22
Engine Cooling Fan is Off
24
Override Active?
No
26
Engine Shuts Down When Idle Shutdown Countdown Expires
Zone 2
28
Engine Cooling Fan is Controlled to Desired Speed and Engine Speed is at Original Idle Speed
Zone 3
30
Engine Cooling Fan and/or Coolant Pump Controlled to Desired Speed and Engine is Controlled to Desired Speed

SYSTEM AND METHOD FOR THERMAL MANAGEMENT OF ENGINE DURING IDLE SHUTDOWN

FIELD OF THE INVENTION

The present invention relates generally to the field of vehicle engine thermal management, and more particularly, to an apparatus and method for rapidly cooling an engine in preparation for effecting idle shutdown.

BACKGROUND AND SUMMARY

Many engines, particularly those in commercial service, spend a substantial amount of time idling; i.e., running while the vehicle is stationary. Many factors contribute to extended periods of engine idling. Under some circumstances, the driver does not desire to shutdown the engine, even if it will be running at idle for comparatively long periods. One example is a delivery truck making frequent, but relatively short stops. It is not unusual for the driver to leave the engine running during these short stops even though fuel could be saved by stopping and restarting the engine. Typically, the driver does not want to be inconvenienced or otherwise delayed. Still others believe that stopping and restarting an engine can use more fuel than what they perceive the engine will consume during the delivery stop. Another reason that a driver might keep the engine running at idle speed is to keep other vehicle systems energized; such systems can include air brakes, air conditioning systems, audio systems, PTO, and the like. Still further, extended engine idling may be experienced in heavily congested areas where traffic is frequently at a standstill.

Under many of these conditions, it is desirable to have a mechanism (method or device) by which the engine can be automatically, safely shut down after idling (i.e., running without vehicle motion) for a certain period of time, to prevent wasteful and unnecessary consumption of fuel.

Certain factors make an engine idle shutdown routine desirable in an automatic shutdown system. One of these factors is the engine temperature. If the engine is shutdown above certain temperatures, for example above 200° F., there is potential for engine damage. A cool down period would be advantageous to allow the engine to reach a safer shutdown temperature. Properly shutting down the engine can extend the life of the engine and other connected components, which is highly desirable. Another factor relates to laws or regulations prohibiting extended engine idling, such as in cities or other populated areas, or in locations where the vehicle is positioned near ventilation air intake systems. An example of the latter is a loading dock where a driver might be tempted to leave his truck idling, but near air-conditioning intakes, which might undesirably take up exhaust from idling delivery vehicles.

On a more general note, exhaust from idling vehicles is a pollutant and is undesirable. Reducing pollution, complying with laws and regulations, and conserving fuel are attributes which reflect well on the operator, vehicle manufacturer, and vehicle owner (whose name is often emblazoned on the vehicle). Also, in vehicles having hybrid drives (an internal combustion engine coupled with an electric machine, for example), it is desirable to shutdown the internal combustion engine quickly for fuel economy. Therefore, an automated engine idle shutdown mechanism is desirable as it turns the engine off after certain preconditions are met.

Stopping the engine quickly is also desirable for vehicles with exhaust aftertreatment devices with catalysts, e.g., catalyzed diesel particulate filters or selective catalytic reduction devices. These devices require high catalyst temperatures to be operational, the so-called "light off" temperature. Extended idling can cool the catalyst by flowing relatively cool idle exhaust over the catalyst, requiring a heating period after restarting the engine. The catalyst cools relatively slowly with the engine off, so quickly shutting down the engine can allow the aftertreatment catalyst to more quickly reach light off temperature after a restart.

U.S. Pat. No. 4,088,110 to Sperline discloses a system having a timer control that delays shutdown after receiving a manual signal (e.g., key turn) for a set time duration to allow the engine to cool. The patent does not disclose sensing or monitoring temperature, and may continue idle for too short a time, which may subject the engine to damage, or too long a time, which is wasteful.

U.S. Pat. No. 4,656,973 to Endres discloses a system that is activated when the operator turns the ignition key to shut down the engine. The system senses engine temperature and will override the key shutdown if the engine temperature is above a pre-set shutdown temperature, and continue to run the engine until the engine temperature is below the pre-set temperature.

U.S. Pat. No. 6,227,153 to Till expressly incorporated herein by reference, discloses an apparatus and method for cooling an engine after shutdown but prior to engine maintenance work for work personnel safety. The '153 patent discloses providing an operator with a key to activate a cool down mode in which the coolant pump and fan are active. Using ambient and engine coolant temperatures, the system determines when the engine has cooled to a temperature sufficiently low to minimize injury to maintenance personnel. However, there is a large variation in the amount of time it takes for the engine to actually shut down. This is caused by the inclusion of a "maximum engine coolant temperature" parameter, which prevents the engine from actually shutting down until the coolant temperature has reached a certain temperature considered to be safe for engine shutdown. Depending on engine and ambient temperatures, there can be as much as a 30 minute variation in overall time elapsed before actual shutdown.

There is a need for improvement in engine idle shutdown apparatus and thermal management methods which integrate with the vehicle's existing systems, monitor various vehicle parameters, and safely and rapidly shut down the engine when prescribed idle conditions exist. These idle shutdown mechanisms need to accomplish the prescribed shutdowns without risk of damage to the engine or associated components, and within a consistent time frame, even when being affected under widely varying vehicle and ambient conditions.

The need for improvement may be illustrated by way of the example of a typical conventional vehicle idle shutdown routine. The idle shutdown procedure begins at t=0, at which point a shutdown timer is activated to time a controlled idle period. After the timer expires, the engine is shutdown. In this example, the vehicle engine coolant temperature is 209° degrees Fahrenheit when the initial idle shutdown conditions are met and the shutdown system is turned on. The vehicle engine cooling fan is off. Because the initial temperature is above 200° degrees Fahrenheit, however, idle shutdown timing is suspended (made inactive) until the engine coolant temperature decreases below a threshold temperature (to prevent engine damage). In this example, the ambient air temperature is above 80° degrees Fahrenheit, which results in slow heat transfer from the engine to the environment, with the temperature decreasing only two degrees Fahrenheit over the first 330 seconds. At this time the engine cooling fan activates, resulting in the vehicle engine coolant temperature decreasing six degrees Fahrenheit in the next 80 seconds. At t=550 seconds, the idle shutdown timer 1 switches from inactive to active status, turning off the engine automatically after a period of 300 seconds has elapsed. Engine load has not changed during this process, remaining at approximately ten percent.

This situation is undesirable since the operator activated the idle shutdown device at t=0, but because the engine coolant temperature was above 200° degrees at t=0, the idle shutdown timer was on hold, or inactive, until the engine coolant temperature decreased to 200° degrees Fahrenheit, at t=550. The idle shutdown timer then switched to active, and shuts the engine down 300 seconds (five minutes) later. Thus, the operator believed that the engine would shutdown 540 seconds (nine minutes) sooner than it did, which could result in violation of laws or regulations, wastes fuel, and adds wear and tear to the engine and its components. As a result, the operator loses faith in the typical idle shutdown device.

In at least one embodiment, the presently disclosed solution takes the form of a method for controlling an automatic shutdown process that promotes cooling down an internal combustion engine of a vehicle to a predetermined safe shutdown temperature when vehicle-idle conditions are detected. The method includes initially determining that vehicle-idle conditions exist. At a minimum, these conditions include making a determination that the engine of the vehicle is running at idle speed. An engine-associated temperature is then measured and it is determined whether the measured temperature is above a first temperature value, said first value being defined according to the risk of engine damage if shutdown at that temperature, as explained in greater detail hereinbelow. In this regard, the engine-associated temperature may relate to any number of engine systems or components, however, for the purposes of clarity of description, the present disclosure primarily focuses on engine coolant temperatures.

Responsive to determining that the measured temperature is above the first threshold, a cooling fan associated with the engine is operated. The engine-associated temperature is monitored and cooling fan operation is reduced when the engine-associated temperature is determined to have decreased below the first threshold temperature value. Typically, the reduction in fan operation will be to zero speed, or stopped, but it is contemplated that the fan may be merely slowed below the operational speed previously affected. Ultimately, engine shutdown is completed when predetermined shutdown conditions are determined to exist, and which may include the vehicle not moving (i.e., stationary), the transmission in neutral or out of gear, the engine at idle speed, and the engine-associated temperature being below the first threshold temperature value.

The invention further contemplates additional cooling action if the engine-associated temperature is above a second threshold value higher than the first threshold temperature. Responsive to this condition, the fan is operated and engine speed is increased above idle speed to increase fan speed to more rapidly cool the engine. When the engine-associated temperature decreases to below the second threshold temperature, engine speed is returned to the idle speed, and the fan continues to operate while the temperature is above the first threshold temperature. A programmed control system is utilized to control the occurrence, level, and time period during which increased engine speed is affected while the cooling fan is engaged, the control managing these parameters so to decrease the engine-associated temperature.

The invention contemplates that a time delay period can be initiated after the engine-associated temperature is determined to have decreased below the first threshold temperature value before engine shutdown is completed. A delay allows an opportunity to notify an operator of the impending shutdown and permit an override signal to be made and acted on. For example, during this time delay the driver of the vehicle may override engine shutdown if, for example, the vehicle is operating in heavy stop-and-go traffic and shutdown is not desirable.

According to the present disclosure, the determination of whether vehicle-idle conditions exist also considers whether the vehicle is stationary. If the vehicle is stationary, then the engine shutdown sequence is initiated.

A preferred embodiment relies on the method utilizing an onboard microprocessor-based control system to automate the engine cool down and shutdown procedures. Those persons skilled in the art will recognize that one or a combination of resident or added computerized controllers may be utilized to implement the prescribed shutdown procedures described herein. In at least one alternative, parameters of the engine cool down and shutdown procedures are programmable and therefore customizable by the vehicle operator, which is not necessarily limited to the driver of the vehicle, but also includes owners, fleet managers, and others having authority.

As an alternative, the engine-associated temperature may be taken as a direct temperature measurement obtained from a sensor located directly on the engine. Still further, the engine-associated temperature may be measured from circulated engine oil, other engine components, engine fluids, engine air intake or exhaust gases, or elsewhere in the engine compartment.

According to the presently described example of the shutdown cooling process, the cooling fan which is associated with a heat dissipating radiator of the vehicle is controlled between on and off operating states in which a substantially constant fan speed is maintained in the on operating state and the cooling fan is essentially stopped in the off operating state. As an alternative, however, the cooling fan may be run at variable speeds depending on the determined engine-associated temperature and/or the ambient temperature. An electric motor driven, fluid motor driven fan, or other variable speed drive may be used for such capability.

As yet another alternative, a variable speed coolant pump may be provided and operated at a selected speed depending on the determined engine-associated temperature and/or ambient temperature to more quickly reduce the engine-associate temperature to an appropriate shutdown temperature.

The first and second threshold temperatures define three temperature zones. A first zone, which is below the first threshold temperature, defines a temperature zone within which the engine may be shutdown without risk of damage from engine heat. In some systems, the first threshold temperature coincides approximately with a thermostat-open temperature of a cooling system of the vehicle, which is generally a safe temperature for safe engine shutdown. A second zone, which is above the first threshold temperature and below the second threshold temperature, defines a temperature zone where shutdown risks engine damage, and within which the cooling fan driven by the engine at idle is effective to cool in the engine in a reasonable time. The third zone is above the second threshold temperature and defines an engine temperature range where shutdown would result in serious damage to the engine and maximum cooling is needed.

Utilizing the cool-down procedures outlined herein, a total rapid engine cooling time period of as little as five minutes can be safely effected, the time being measured from when vehicle-idle conditions are first determined to exist, and the shutdown is initiated, and continuing during engine cooling control until engine shutdown is completed. In this manner, regulations that prescribe such time limits can be attained. Heretofore, such regulatory time limits have been on the order of ten to thirty minute shutdown periods, which the presently disclosed method and procedure handily accommodate, but more stringent restrictions are predicted on the order of five minutes which can be similarly accommodated, and which have been previously out of reach without causing heat damage to the engine in some circumstances.

BRIEF DESCRIPTION OF THE DRAWINGS

The sole FIGURE is schematic flow diagram illustrating an embodiment of the disclosed invention.

DETAILED DESCRIPTION

The appended FIGURE illustrates schematically an embodiment of the presently disclosed idle shutdown (ISD) method and system. The ISD may be controlled by the VECU (vehicle electronic control unit). Optionally, the actual logic control of the engine cooling fan(s) can be assigned to the engine management system (EMS) or any other convenient device.

In the illustrated flow diagram, the idle shutdown prerequisite parameters are monitored 10, and if determined to be met 11, control passes to the idle shutdown (ISD) sequence 12. Idle shutdown prerequisite parameters may include one or more of: (i) whether the vehicle has been stationary for a predetermined period of time (zero vehicle speed); (ii) whether the engine has been running at idle speeds for a predetermined period of time; (iii) whether the vehicle parking brake is engaged; and, (iv) whether an idle shutdown timer has activated, either automatically, or based on action taken by the operator.

The system will then determine whether an idle shutdown override has been requested 14, which may be manually by the operator or automatically by a change in one of the prerequisites. Upon receiving an override signal, idle shutdown is suspended and the engine continues to run until the condition changes. An override may be temporary 16, such as may occur, for example, if the vehicle is in heavy traffic and then moves (i.e., vehicle speed increases above zero or a low threshold) or the operator presses on the accelerator to increase engine speed. In the case of a temporary override, the system will return to monitoring the idle shutdown prerequisites 10. An override may also be instituted by the operator manually entering an override command 18, for example, by a key press entry. In this case, the system will wait for a reset.

Absent an override, idle shutdown procedure control passes to temperature monitoring 20. The ISD continually monitors the engine coolant temperature 20 and compares the temperature to first and second threshold temperatures. The threshold temperatures define three temperature zones, Zone 1 at or below the first threshold temperature, Zone 2 above the first threshold temperature and at or below the second threshold temperature, and Zone 3 above the second threshold temperature. The zones identify temperature ranges relating to the risk of damage to the engine if shutdown in that zone. Zone 1 represents a temperature range in which shutdown is not likely result in engine damage, that is, the normal shutdown range. Zone 2 represents a temperature range where a shutdown has a moderate risk of engine damage and some cooling is required prior to shutdown. Zone 3 represents a temperature range where there is a high risk of engine damage on if shutdown occurs and more vigorous cooling measures are required.

The actual threshold temperatures will be determined using factors for the specific engine, duty cycle of the vehicle, and the ability to dissipate heat in the operating environment. For example, on a 16 liter engine in an over-the-highway truck, which runs for much of its duty cycle at steady state high revolutions, a first threshold temperature may be 187° F., which is approximately the open thermostat temperature. Continuing the example, the second threshold temperature may be 200° F., above which approaches the boiling point of water. For vocational trucks and trucks with power takeoff equipment, which operate cyclically, the threshold temperatures may be different. Those skilled in the art will appreciate how to set the thresholds to protect an engine from heat damage. For operating environments of extremely high ambient temperatures, the threshold temperatures may be adjusted downward by the ISD to compensate for the diminished ability of the engine to cool.

Each of the zones is associated with specific measures the ISD will take if the engine-associated temperature is found to be in that zone. If the engine-associated temperature is below the first threshold temperature, which is the generally safe shutdown zone, the engine cooling fan is turned off or remains off 22. If an override is then found to be active 24, the ISD reverts to Step 14 and the countdown is suspended. If the override is not active, the idle countdown continues, until expiration, at which time the engine is shutdown 26.

If the ISD detects the engine-associated temperature above the first threshold temperature but at or below the second threshold temperature, that is, in Zone 2, the engine cooling fan is turned on 28 to cool the engine to below the first threshold temperature. Temperature monitoring 20 continues, and once the engine-associated temperature is determined to be in Zone 1, the ISD institutes Step 22, and the engine cooling fan is turned off. If the override is not active, the idle count down continues to expiration 26, and the engine is shutdown.

If the engine-associated temperature is above the second threshold temperature, that is, the temperature is determined to be in Zone 3, the cooling fan is activated and the engine speed is raised above idle 30 to increase the cooling fan speed for more rapid cooling of the engine. The controller monitors the engine-associated temperature 20 to ensure that the engine temperature is decreasing and will adjust the engine speed accordingly. Once the coolant temperature drops below the second threshold temperature, that is, decreases to Zone 2, the ISD method institutes Step 28, engine speed is returned to normal idle speed, and the fan operates at a speed reduced from that of the Zone 3 controlled speed. The method continues from Step 28 as described above.

As described, Step 30 is appropriate for a cooling fan that is directly driven by the engine, where fan speed is related to engine speed. For vehicles in which the fan is electrically driven or hydraulically driven, or where fan speed is otherwise independent of the engine speed, the ISD method will not increase engine speed, but will control fan speed directly to effect the cooling necessary to reduce the engine-associate temperature from Zone 3.

Alternatively, or in addition, the vehicle may be equipped with a variable speed coolant pump, which may be operated similar to the fan to increase engine cooling when needed. Controlling the coolant pump may be used when the engine-associated temperature is in Zone 3. In addition to, or as an alternative to increasing the fan speed, the coolant pump flow rate may be increased to increase the cooling effect on the engine until the temperature is in Zone 2.

The engine-associated temperature may be determined from the engine coolant temperature, the engine oil temperature, transmission fluid temperature, and/or other parameters measured by the VECU or engine management system (EMS). One or a combination of these temperature measurements can be used by the ISD to determine which temperature zone the engine is in, that is, whether it is safe for the engine and its related components to be shut down by the ISD.

As mentioned, the ISD function can be controlled by a vehicle electronic control unit (VECU), which typically monitors and controls the vehicle's various systems. Alternatively, the ISD can be located within the engine management system (EMS). The ISD function operates the engine cooling fan, control engine speed, as well as control other related systems that have an effect on the operating temperature.

The ISD includes a threshold limit incorporated into the cooling fan engagement instruction. For example, when the engine-associated temperature falls to just slightly above the thermostat opening temperature or first threshold temperature, the cooling fan disengages.

In the event of the ISD override, the engine cooling fan may be immediately disengaged or engaged until a desired temperature is reached.

The present invention eliminates the existing maximum engine coolant temperature constraint by operating the engine cooling fan(s) in a controlled manner to achieve rapid cooling of the engine in preparation for shutdown.

The ISD further provides thermal engine damage protection while meeting a 5-minute maximum idle time limit as enacted in some jurisdictions. For other jurisdictional locations with longer duration idle limits, the ISD can be configurable to conform with such regulations, or operator preference.

The ISD timer time-parameter, that is, the shutdown countdown, may be made adjustable. Such adjustability enables the system to operate for a period of time sufficient to cool the engine to desired levels, while still complying with idle-limit laws in the particular location in which the vehicle is located. This embodiment is extremely desirable for situations in which the vehicle is located in very hot environments (e.g., desert).

While preferred embodiments of the presently disclosed solutions have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the claims.

What is claimed is:

1. A method for controlling a vehicle engine for an automated shutdown process, comprising the steps of:

determining that vehicle engine shutdown conditions exist, said conditions including at least that the engine is running at a predefined idle speed;

determining an engine-associated temperature;

comparing the engine associated temperature to a first threshold temperature and to a second threshold temperature higher than the first threshold temperature;

responsive to said engine-associated temperature being above the second threshold temperature, operating at least one of a cooling fan associated with the engine at a speed above a cooling fan engine idle speed and a coolant pump associated with the engine at a speed above a coolant pump engine idle speed to allow the engine-associated temperature to fall below the second threshold temperature;

responsive to said engine-associated temperature being above the first threshold temperature, operating a cooling fan associated with the engine and operating the engine at the predefined idle speed to allow the engine-associated temperature to fall below the first threshold temperature;

responsive to said engine-associated temperature being below the first threshold temperature, reducing cooling fan operation; and completing an engine shutdown process responsive to the predetermined shutdown conditions being determined to exist, said conditions including at least that the engine-associated temperature is not greater than the first threshold temperature.

2. The method as recited in claim 1, wherein the step of operating at least one of a cooling fan associated with the engine at a speed above a cooling fan engine idle speed and a coolant pump associated with the engine at a speed above a cooling pump engine idle speed includes operating the engine at a speed above the predefined idle speed.

3. The method as recited in claim 2, further comprising controlling the engine speed and cooling fan so that the engine-associated temperature decreases, said control including the occurrence and time period during which increased engine speed is affected while the cooling fan is engaged.

4. The method as recited in claim 1, further comprising monitoring the engine-associated temperature and controlling the at least one of the cooling fan and coolant pump to increase a rate of engine-associated temperature cooling, said controlling including controlling a speed, occurrence and time period.

5. The method as recited in claim 1, wherein the step of completing the engine shutdown process further comprises initiating a time delay period before shutdown of the engine.

6. The method as recited in claim 1, wherein said vehicle-idle conditions include the condition of whether the vehicle is stationary, and wherein the engine shutdown process is interrupted if the vehicle is no longer stationary.

7. The method as recited in claim 1, comprising the steps of monitoring the engine idle conditions and engine associated temperature with an onboard microprocessor-based control system, and further comprising sending a signal to alert an operator that the engine shutdown process has initiated.

8. The method as recited in claim 7, further comprising the steps of accepting a manual override request and interrupting the engine shutdown process.

9. The method as recited in claim 1, wherein the engine-associated temperature is taken as a direct temperature measurement obtained from a sensor located directly on the engine.

10. The method as recited in claim 1, wherein the engine-associated temperature is a measured temperature of circulated engine oil.

11. The method as recited in claim 1, wherein the engine-associated temperature is a measured temperature of circulated coolant in a coolant system of the vehicle.

12. The method as recited in claim 1, wherein the cooling fan is associated with a radiator utilized to dissipate heat from circulating engine coolant, the method further comprising controlling the cooling fan between on and off operating states wherein a substantially constant fan speed is maintained in the on operating state and the cooling fan is essentially stopped in the off operating state.

13. The method as recited in claim 1, wherein the cooling fan which is associated with a radiator utilized to dissipate heat from circulating engine coolant, the method further comprising controlling the cooling fan at variable speeds responsive to the determined engine-associated temperature in excess of the predetermined hot temperature value.

14. The method as recited in claim 1, wherein the first threshold temperature value coincides approximately with a thermostat-open temperature of a cooling system of the vehicle.

15. A method for controlling a vehicle engine during idle in preparation for shutdown, said method comprising the steps of:

determining that vehicle engine idle conditions exist, said conditions including at least that the engine is running at a predefined idle speed;

determining an engine-associated temperature;

comparing the engine associated temperature to a first threshold temperature and a second threshold temperature higher than the first threshold temperature;

responsive to said engine-associated temperature being above the second threshold temperature, operating a cooling device associated with the engine above an idle level and operating the engine at a speed above the predefined idle speed to allow the engine-associated temperature to fall below the second threshold temperature;

responsive to said engine-associated temperature being above the first threshold temperature and below the second threshold temperature, operating a cooling fan associated with the engine and operating the engine at the predefined idle speed to allow the engine-associated temperature to fall below the first threshold temperature;

responsive to said engine-associated temperature being below the first threshold temperature, reducing cooling fan operation; and completing an engine shutdown process responsive to the predetermined shutdown conditions being determined to exist, said conditions including at least that the engine-associated temperature is not greater than the first threshold temperature.

* * * * *